Aug. 17, 1965   E. JUSTI ETAL   3,201,282
CATALYST ELECTRODE
Filed July 13, 1959   5 Sheets-Sheet 1

FIG. 1

INVENTORS:
EDUARD JUSTI, KARL-HERMANN FRIESE, AUGUST WINSEL

By Burgess, Dinklage + Sprung
ATTORNEYS

Aug. 17, 1965  E. JUSTI ETAL  3,201,282
CATALYST ELECTRODE
Filed July 13, 1959  5 Sheets-Sheet 2

FIG.2

INVENTORS
EDUARD JUSTI, KARL-HERMANN FRIESE, AUGUST WINSEL
By Burgess, Dinklage + Sprung
ATTORNEYS Aug. 17, 1965 E. JUSTI ETAL 3,201,282
CATALYST ELECTRODE
Filed July 13, 1959 5 Sheets-Sheet 3

FIG. 3

INVENTORS:
EDUARD JUSTI, KARL-HERMANN FRIESE, AUGUST WINSEL

Burger, Dinklage & Sprung
ATTORNEYS

FIG. 4

United States Patent Office 3,201,282
Patented Aug. 17, 1965

3,201,282
CATALYST ELECTRODE
Eduard Justi, Karl-Hermann Friese, and August Winsel, all of Braunschweig, Germany, assignors, by mesne assignments, to Varta Aktiengesellschaft and Siemens-Schuckert-Werke Aktiengesellschaft, Erlangen, Germany, both German corporations
Filed July 13, 1959, Ser. No. 826,812
Claims priority, application Germany, July 19, 1958, R 23,720
18 Claims. (Cl. 136—86)

The present invention relates to electrodes and, more particularly, to porous catalyst electrodes for use in fuel cells, which are capable of suppressing disturbing reactions occurring in the absence of current at the electrodes in fuel cells.

It is known that the combustion energy of certain organic substances can be converted into electrical energy with high efficiency by means of fuel cells containing an aqueous electrolyte and operated at temperatures of below 100° C. Suitable fuel cathodes for this purpose are especially those which contain Raney nickel as the active substance, e.g. double-skeleton catalyst electrodes such as those disclosed in German Patent No. 1,019,361 as well as cathodes such as the recently suggested catalyst sieve electrodes. The latter electrodes consist of a catalytically active or inactive frit portion and a sieve portion extending substantially parallel thereto, the same being provided with current leads. Between the frit and the sieve portions is arranged a granular or pulverulent, electrically conductive and catalytically active material.

The above mentioned double-skeleton catalyst electrodes contain from 20% to 80% by weight of Raney metal powder embedded in an electrically conductive supporting skeleton. The catalyst sieve electrodes, on the other hand, contain a loosely poured arrangement of Raney metal powder granules, situated between two micro-sieves simultaneously serving as the current tap connections.

As is also known, soluble or liquid fuels, such as alcohols and formic acid, can be converted with particular advantage into electrical energy in fuel cells by admixing them with the electrolyte of the fuel cell. In this case, however, it is necessary for the counter electrode, i.e. the oxygen anode, to be catalytically inert to the fuel.

Certain organic fuels, such as ethyl alcohol and formic acid, have the objectionable property of being able to be oxidized on catalytically active electrodes, e.g. those containing Raney nickel, in the presence of a concentrated alkaline solution as the electrolyte, even in the absence of current, with formation of molecular hydrogen. Therefore, cells equipped with electrodes of this type are subject to a constant loss of these fuels, which seriously reduces the useful life, the efficiency and also the dependability of the cells in operation. The constant conversion of these fuels on electrodes which are not in circuit is caused by the catalytic properties of the electrode itself. Thus, for example, Raney nickel is capable of functioning as a reversible hydrogen electrode which permits chemical and electrochemical equilibrium to be established between several hydrogen-containing phases or materials in contact therewith.

Specifically, in a process using potassium formate as the fuel and potash solution as the electrolyte, the oxidation of the formate in the potash solution proceeds to the formation of potassium carbonate and water:

$$HCOOK + KOH + \tfrac{1}{2}O_2 = K_2CO_3 + H_2O$$

In view of the change of free enthalpy, an electromotive force of 1.4 volts should be measured on a cell of this type, consisting of a formate electrode, an oxygen electrode and potash solution as the electrolyte, with a completely reversible electrochemical course of reaction. Such electromotive force is above that of an oxyhydrogen cell (1.23 volts). Thus, the potential of the formate electrode, based on the oxygen reference electrode, is more negative by 0.2 volt than that of the reversible hydrogen electrode. If the electrode body of the formate electrode is capable of simultaneously functioning as a reversible hydrogen electrode, an evolution of hydrogen will take place thereat, which becomes more vigorous as the potential of the electrode becomes more negative in comparison with the reversible hydrogen potential.

As a result, for example, electrodes containing Raney nickel and operated with formate as the fuel establish the hydrogen potential and, with no current drawn, constantly convert formate and potash solution so as to form carbonate and hydrogen:

$$HCOO^- + OH^- \rightarrow CO_3^{--} + H_2$$

Thus, a mixed potential is measured from the anodically charged formate electrode and the cathodically charged hydrogen electrode, which are combined (i.e. short-circuited) in a single electrode body. Although efforts could be made to enforce the reversibility of the foregoing electrode process by correspondingly increasing the hydrogen pressure in the cell, pressures of an order of magnitude of 100 kg./cm.² would be required to this end, and these are impossible to consider in practice in fuel cells.

A further example of such a reaction, wherein a gas is evolved even with no current drawn, is the reduction of hydrogen peroxide on electrodes which contain silver or Raney silver. Upon immersing such an electrode in a potash solution, which contains $H_2O_2$, a very vigorous evolution of oxygen is observed on the electrode, which may be fully arrested by applying a certain cathodic current. Although the reversible oxygen potential is not reached in this case (i.e. the mechanism of an oxygen evolution analogous to the above mentioned hydrogen evolution cannot be present), there is nevertheless likewise involved in this reaction a constant consumption of the current-supplying substance on the currentless electrode.

Catalyst sieve electrodes have already been proposed for devices used for the electrochemical conversion of liquid materials, preferably fuel cells. These electrodes comprise two substantially parallel and electrically conductive sieves provided with connection leads and have situated therebetween a granular or pulverulent electrically conductive and catalytically active material in loosely poured arrangement. According to another suggestion, reactions proceeding with the evolution of hydrogen are controlled by using catalyst sieve electrodes, the sieves of which are designed so as to offer a high flow resistance to the hydrogen evolved on the catalyst, while allowing the liquid mixture of electrolyte, fuel and reaction product to pass with a low resistance to the flow. These electrodes are not solid bodies, and the catalytically active material contained therein is not fastened or secured to the metal sheets which provide the shape of the electrode.

Gas diffusion electrodes are also known (F. T. Bacon, British Patent No. 667,298), which consist of two porous, chemically and especially catalytically identical nickel layers having different pore radii. The layer on the gas side has the larger pore radius, i.e. about 16 microns, while the layer on the electrolyte side has the smaller pore radius, i.e. about 8 microns. Corresponding to the capillary action of the electrolyte in the pores of different size, the gas pressure required for displacing the electrolyte from the pores is different for both layers. At 25° C., it is about 0.09 kg./cw.² gauge for the larger pore layer and 0.18 kg./cm.² gauge for the smaller pore layer. With a gas pressure of, for example, 0.15 kg./cm.² gauge, only the fine-pored layer is filled by the electrolyte, while the wide-pored layer on the gas side is blown free. At the interface between the layers, the three-phase interface of electrode/electrolyte gas develops, which is where the electrochemical dissolution of the gas takes place. If a catalytically active electrode, consisting of a single layer having an average pore radius $r_1$, is immersed into a reaction solution consisting of an electrolyte and a fuel, the gas evolving in the electrode will displace part of the reaction solution from the interior. However, even in the absence of current, the reaction will not be suppressed at any point of the electrode. As soon as the gas present in the interior of the layer has reached the capillary pressure of the electrolyte in the pores, bubbles will emerge from the pores and enter the electrolyte, and in place of the bubbles the electrolyte will again penetrate into the pores. It is especially at the surface, where the contact between the reaction solution and the electrode will always exist, that the reaction is allowed to proceed without any inhibition.

It is an object of the present invention to overcome the foregoing disadvantages and to provide a compact electrode which is capable of suppressing a reaction proceeding with evolution of gas in the absence of current.

Other and further objects of the invention will become apparent from a study of the within specification and accompanying drawings, in which.

In accordance with the invention, it has been found that an automatic interruption of the aforementioned undesirable constant consumption reaction may be realized by providing electrodes, especially for the electrochemical generation of energy from those liquid reducible or oxidizable substances or those liquid solutions of reducible or oxidizable substances which generally react at the catalytically active portions of the electrode, even in the currentless state of the electrode, with formation of at least one gaseous and electrochemically convertible component as well as for the evolution of gaseous materials, which are formed of layers of materials of different properties, including a catalytically active working layer and a catalytically inactive surface layer. The catalytically active working layer is porous and has an average pore radius $r_1$. The catalytically inactive surface layer is also porous and has an average pore radius $r_2$, which is smaller than radius $r_1$ at any one point and greater than zero in at least one surface portion. The surface layer is provided as a covering, disposed over part or all of said working layer, and is firmly connected thereto. Specifically, the catalytically inactive surface layer covers the working layers at least to the extent that all the ions emitted from the counter electrode, which travel through the electrolyte and terminate in the working layer, must first penetrate and pass through the covering surface layer in order to reach the working layer.

If the electrode of the invention is to be used for the electrochemical generation of energy from substances which react with evolution of hydrogen or is to be used for the evolution of hydrogen, the working layer is preferably made of a material which, in contrast to the surface layer, acts as a reversible hydrogen electrode. On the other hand, the surface layer is preferably made of a material having a hydrogen minimum overvoltage with respect to the reversible hydrogen potential under the operating pressure in the electrolyte solution, said overvoltage being higher than the potential of the reversible hydrogen electrode under a hydrogen pressure, which is equal to the capillary pressure of the electrolyte within the pores of the surface layer.

In this way, a cathodic evolution of hydrogen is prevented from taking place at the surface layer of the non-charged electrode in contact with the electrolyte. If the surface layer were capable of establishing the reversible hydrogen potential, it would constitute together with the working layer a pair of short-circuited hydrogen electrodes under different hydrogen pressures. Between these layers, an equalizing current could then flow, which would charge the working layer anodically and the surface layer cathodically, transport hydrogen out of the working layer and into the electrolyte and consequently cause the reaction to proceed in a constant manner.

The importance of the hydrogen or oxygen minimum overvoltage of the electrode material is particularly clearly exemplified by the conventional lead storage battery. With a water decomposition voltage of 1.23 volts, the only reason for its capability of maintaining a voltage of 2 volts for weeks on end is because the hydrogen minimum overvoltage on lead is more than 400 mv. and the oxygen minimum overvoltage is even more than 440 mv. Therefore, the decomposition of water on lead plates requires a voltage above 2.07 volts, and this is impossible to attain at the operating voltage of the lead storage battery.

If the electrode in accordance with the invention is to be used for the generation of energy from substances which react with evolution of oxygen, e.g. from hydrogen peroxide or from hydrogen peroxide-containing liquids or is to be used for the evolution of oxygen, it is preferred that the working layer operate as the oxygen electrode. On the other hand, the surface layer is preferably made of a substance having an oxygen minimum overvoltage, with respect to the reversible oxygen potential under the operating pressure in the electrolyte solution, said overvoltage being higher than the reversible oxygen potential under an oxygen pressure, which is equal to the capillary pressure of the electrolyte within the pores of the surface layer.

In the case where the electrodes of the invention are to be used in processes involving the evolution of hydrogen or are to be used for the evolution of hydrogen, the working layer advantageously contains a metal of the 8th sub groups of the periodic table of elements, such as iron, cobalt, palladium, platinum and particularly nickel, while the working layer of electrodes to be used in processes involving the evolution of oxygen or for the evolution of oxygen advantageously contains silver.

If the working layer of the electrode of the invention is intended to be adapted as closely as possible to the ideal case of a reversible oxygen electrode, it is preferably made of a metal which has a low oxygen minimum overvoltage, preferably nickel, in addition to silver, which particularly well catalyzes the cathodic reduction of oxygen.

It is particularly advantageous in any case if the working layer is constructed in the form of a double-skeleton catalyst electrode (according to German Patent No. 1,019,361), i.e. an electrode containing from 20% to 80% by weight of a catalytically active Raney metal embedded in 80% to 20% by weight of electrically conductive supporting skeleton material. The surface layer likewise may have this structure, which ensures a particularly favorable pore distribution. However, in this case the Raney metal use for the surface layer must be catalytically inactive with respect to the reaction proceeding on the electrode.

The extent to which the inactive surface layer must cover the active working layer is generally dependent upon the particular use contemplated.

Figure 1:
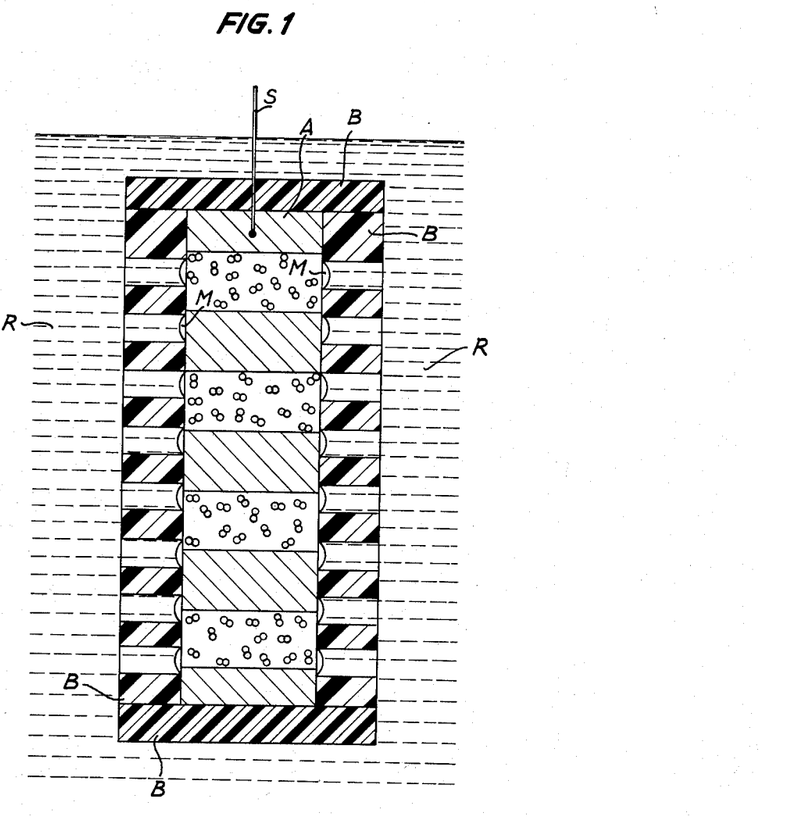
FIG. 1 is a diagrammatic elevation in section of one embodiment of an electrode in accordance with the invention, wherein both sides of the electrode are exposed to the electrolyte.

Thus, where the subject electrode is to be completely immersed in a solution of the material to be converted in the electrolyte, the inactive surface layer must, of course, surround the working layer on all sides. This arrangement is diagrammatically shown in FIG. 1, wherein A represents the catalytically active working layer, B the surface layer, S the current tap, R the reaction solution which includes the electrolyte and the fuel, while M represents the electrolyte meniscus within the pores of the surface layer.

Figure 2:
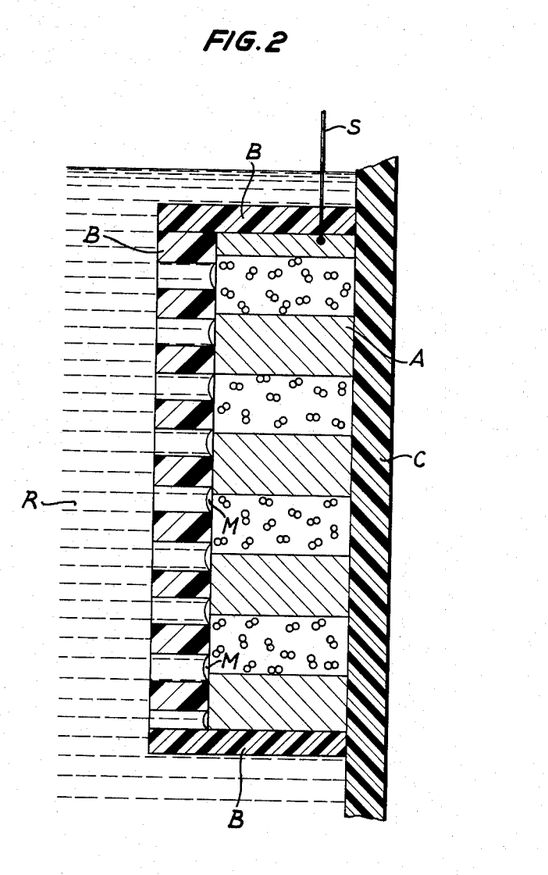
FIG. 2 is a diagrammatic elevation in section of another embodiment of an electrode in accordance with the invention, wherein only one side of the electrode is exposed to the electrolyte.

Although it is necessary for the pore radius of the surface layer to be smaller at any one point than that of the working layer, it need not be necessarily constant or equal throughout. Thus, for example, part of the surface layer may be non-porous, i.e. have a pore radius of zero. This is sometimes the case, for example, if the electrode is mounted on the fuel cell wall. This case is illustrated in the embodiment of FIG. 2, wherein A is the working layer, B the porous surface layer, C the surface layer degenerated to form a non-porous surface, R the reaction solution which includes the electrolyte and the fuel, and S is the current tap.

A further potential use of the electrodes of the invention is provided by arranging the electrode as a partition wall between two cell spaces, one of which contains the electrolyte and the counter electrode and the other of which contains the reducible or oxidizable fuel substance to be converted electrochemically, which is in the form, as the case may be, of a liquid or a solution. In this case, the electrolyte and the reaction liquid penetrate into the working layer from either side respectively of the electrode. In the working layer, gas is evolved which forces back the two liquids, i.e. the electrolyte is forced back through the penetrated pores of the surface layer on the electrolyte side of the electrode and the fuel substance is forced back through the penetrated pores of the surface layer on the fuel substance side of the electrode. In order that the aforementioned objectionable process may be suppressed, surface layers having a smaller pore radius than the pore radius of the working layer must be provided on both sides of said working layer.

Where possible diffusion of the two liquids, which are normally separated by the electrode, into one another need not be feared, it is sufficient if the surface layer facing the reaction solution cell space is catalytically inactive. In this instance, the surface layer facing the electrolyte cell space, as well as the working layer, may be active. However, since it will never be possible to prevent this diffusion entirely, the surface layer on the electrolyte side preferably should be made catalytically inactive as well. Moreover, it is advantageous if the pore radius of the surface layer on the electrolyte side is smaller than that of the surface layer facing the reaction solution. This will ensure that the gas evolved in the working layer will readily displace the reaction solution from the surface layer, which is in contact with the reaction solution at a pressure at which the gas is not yet capable of displacing electrolyte and of escaping from the surface layer on the electrolyte side.

Figure 3:
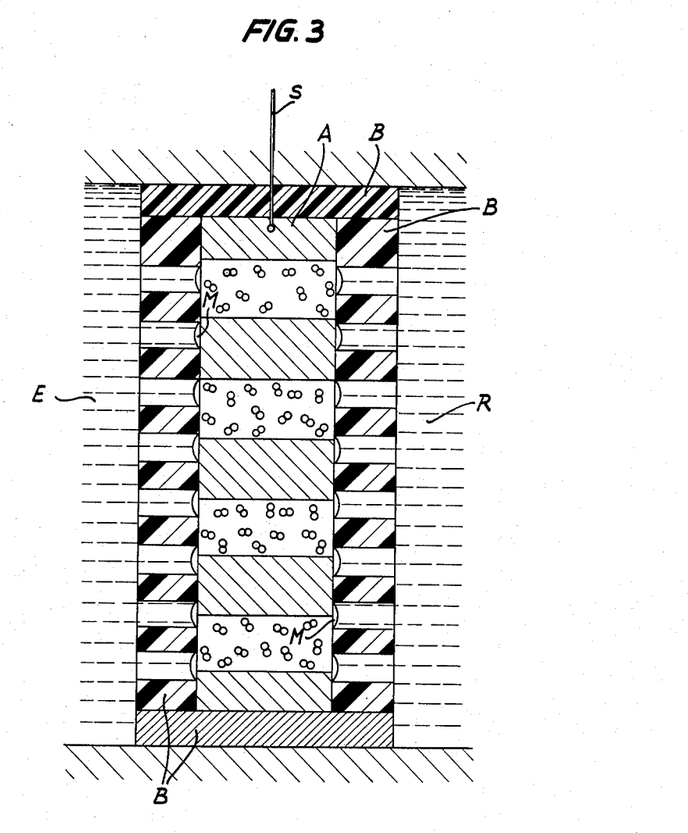
FIG. 3 is a view of an embodiment similar to that of FIG. 1, wherein one side of the electrode is exposed to the electrolyte and the other is exposed to a reaction liquid.

The arrangement of the electrode as a partition wall between the electrolyte and the reaction solution is illustrated in the embodiment of FIG. 3, wherein A is again the working layer, B the surface layer, S the current tap, M the meniscus within the pores of the surface layer, and R is the reaction solution on one side of the electrode and E the electrolyte on the other side.

Figure 4:
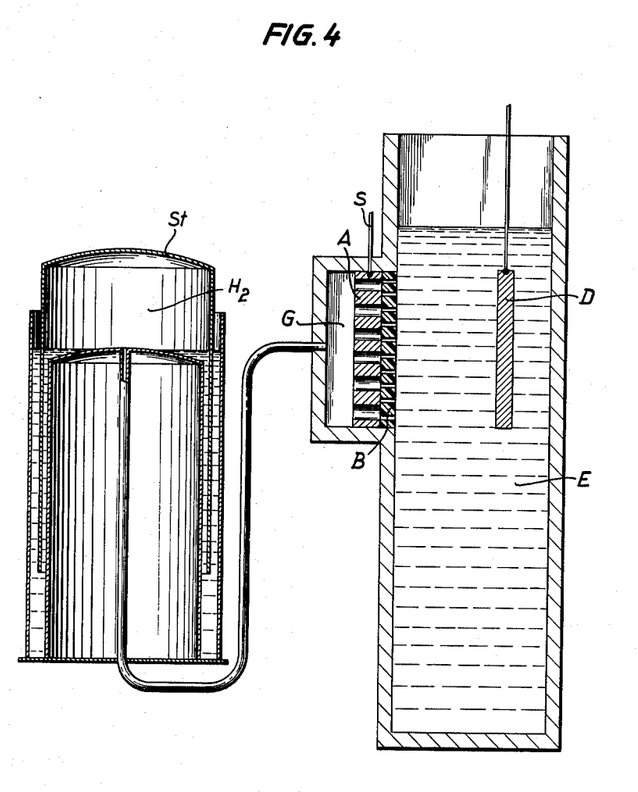
FIG. 4 is a diagrammatic elevation, partially in section, of a further embodiment of an electrode in accordance with the invention, wherein one side of the electrode is exposed to the electrolyte and the other communicates with a gas space.

A further embodiment of an electrode in accordance with the invention which may be used in electrolyzers is shown in FIG. 4. In this arrangement, a two-layer electrode, having a wide-pored working layer A which operates as a reversible hydrogen electrode and a narrow-pored surface layer B located on the electrolyte side and which is formed of a material having a high hydrogen minimum overvoltage, is located as a partition wall between two enclosed spaces E and G. Space E contains the electrolyte and the second electrode D, while space G is connected to a barostate or storage tank $St$, the operating pressure of which is lower than the capillary pressure of the electrolyte within the pores of the surface layer of the electrode.

When subjecting the electrode to a cathodic current, hydrogen is evolved at the wide-pored working layer A. This hydrogen is not able to pass into the electrolyte E through the small-pored layer B, due to the capillary pressure of the electrolyte within the pores of the surface layer B. Instead, the hydrogen emerges from the working layer A and enters space G maintained under a constant gas pressure. No hydrogen is evolved at the surface layer B itself as long as the deviation from the reversible hydrogen potential caused by the cathodic current is lower than the hydrogen minimum overvoltage of the surface layer. Instead, all of the hydrogen is evolved in the working layer A. The character S designates the current tap for the electrode.

Since the electrode of the invention may also operate in an inverse sense as a diffusion electrode similar to the Bacon electrode, referred to hereinabove, it constitutes together with an analogously constructed oxygen electrode an arrangement for the storage of energy. This is particularly suited for non-attended small units, e.g. for the storage of solar energy.

Figure 5:
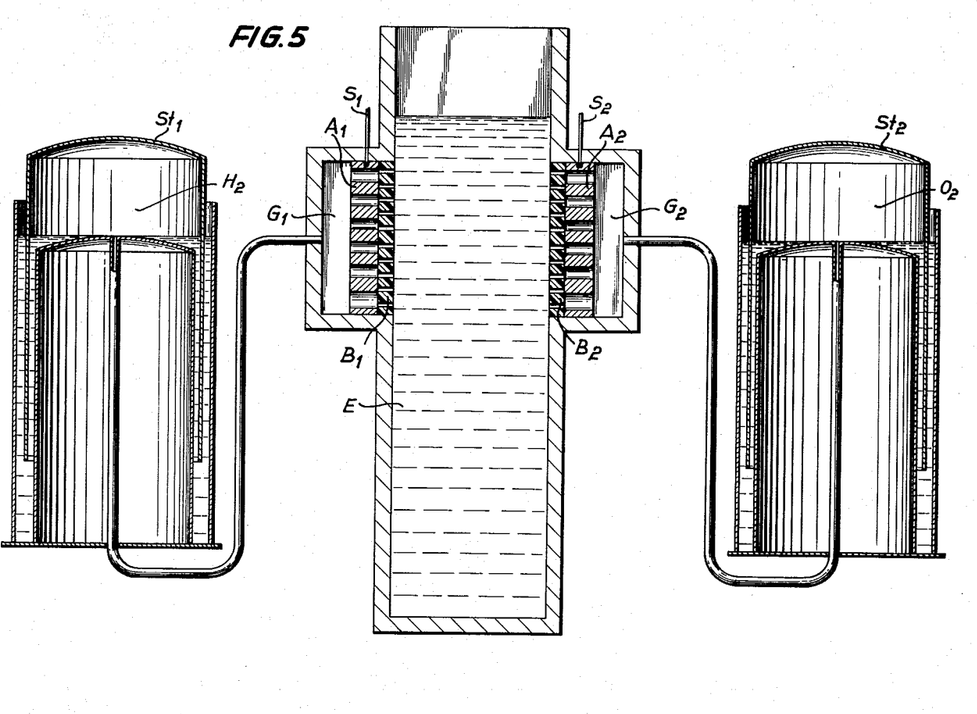
FIG. 5 is a diagrammatic elevation, partially in section, of a further embodiment of the invention similar to that of FIG. 4, wherein both hydrogen and oxygen electrodes and gas spaces are provided.

A complete storage unit of this type, which is also reversible with respect to the direction of flow of the reaction gases, is shown in FIG. 5, wherein $A_1$ and $A_2$ are the working layers of the hydrogen and oxygen electrodes, respectively, $B_1$ and $B_2$ are the surface layers of the hydrogen and oxygen electrode, respectively, $S_1$ and $S_2$ are the current taps of the hydrogen electrode and oxygen electrode, respectively, $G_1$ and $G_2$ are the gas spaces of the hydrogen electrode and oxygen electrode, respectively, $St_1$ and $St_2$ are the barostates or storage tanks for hydrogen and oxygen, respectively, and E designates the electrolyte.

The preparation of the electrodes in accordance with the invention may be effected by various methods.

If only sinterable metals or electrically conductive semi-conductor substances are used for forming the electrode, the material used for forming the porous working layer is preferably in the form of a powder. This powder is pressed in a die with the addition, if necessary or desired, of pore-forming substances, such as citric acid or other easily decomposable materials. The pressed powder part is then sintered, the preferably pulverulent material used for forming the surface layer is pressed thereon, and the composite member is sintered again.

Another method is to introduce the pulverulent materials used for forming the working and surface layers into the die in the order required, with the addition, if necessary or desired, of a pore-forming substance, then pressing the powders in a single operation and thereafter sintering the pressed part.

As a departure from these methods, it is frequently advantageous to combine the pressing and sintering steps by carrying out the pressing at an elevated temperature.

It is also possible to apply a porous metallic layer, e.g. of Cu, Ni, Pb, Ti, etc., as the surface layer to the already pressed and sintered working layer by electro-plating techniques, provided that the metal meets the aforesaid requirement of catalytic inactivity with respect to the electrode reaction desired.

Of course, the number of potential combinations of materials is very great, the selection being dependent upon the particular use of the electrode body. While the electric conductivity of the working layer should always be as high as possible, the surface layer need not be, but rather may be in form of porous layers of plastic materials firmly adhering to the working layer instead.

The pore radii $r_1$ and $r_2$ of the electrode of the invention may be largely adapted to the particular requirements by using powders for making the electrode body layers with defined particle sizes, preferably homogenized for example by wind-sifting or sedimentation and screening. Thus, it is possible to preselect as desired the average pore radius of such an electrode layer between, for instance, 0.1 and 100 microns. For practical use, the range of pore radii of between 0.5 and 50 microns has been found to be best suited, since the resultant capillary pressures reached in operation are easily accommodated to conventional valves and pressure gauges.

Of course, it is important for the difference of the pore radii of the working layer and the surface layer $r_2$ to be sufficiently great so as to offset safely any variations of the pore radii with respect to the average pore radius of each particular layer, which may occur in all practical cases. Therefore, the average pore radii are advantageously chosen such that there is optimumly only little overlapping of the distribution functions of the pore radii of the working and surface layers. It has been found that the relation $r_1 \geqq 1.5 \cdot r_2$ sufficiently excludes any significant overlapping of this pore distribution function.

In the case where the electrode of the invention is formed of Raney alloy material, since the activation of the working layer containing the Raney alloy by dissolving out the soluble alloying constituents by means of acids or preferably alkaline solutions is a reaction in which hydrogen is generally evolved, it is of great advantage to sustain this activation according to an already suggested process of controlled activation. This is achieved by maintaining the potential of the electrode constantly or temporarily more positive than the reversible hydrogen potential under atmospheric pressure in the activating solution. This measure prevents the formation of hydrogen gas cushions in the interior of the working layer, which cushions displace the activating solution from the working layer and consequently greatly delay or even fully suppress the activation process. The polarization current is preferably chosen such that the potential of the electrode to be activated is by 100 to 2000 mv. more positive than the potential of the reversible hydrogen electrode under atmospheric pressure in the activating solution.

The following examples are given to illustrate the invention, and it is to be understood that the invention is not to be limited thereto.

*Example 1*

The following mixtures of powders were uniformly introduced in succession into a die mold of 40 millimeters diameter:

(a) 1 gram of a mixture of 1.2 parts by weight of copper powder consisting of particles of 3 to 10 microns diameter and 1.0 part by weight of a pulverulent Raney copper alloy consisting of particles of 30 to 50 microns diameter and containing Cu and Al in a ratio of 50:50 by weight.

(b) 10 grams of a mixture of 1.5 parts by weight of carbonyl nickel powder having a particle diameter of 1 to 5 microns and 1.0 part by weight of a pulverulent Raney nickel alloy having a particle diameter of 75 to 100 microns and containing Ni and Al in a ratio of 50:50 by weight.

(c) 1 gram of a mixture of powders as described under (a) above.

The electrode was compacted by pressing at a temperature of 450° C. and a pressure of 5000 kg./cm.$^2$. Following this, the aluminum was dissolved out of the electrode by means of 6-normal potash solution in order to form the double-skeleton catalyst electrode structure. In doing so, the potential of the electrode was kept by 300 mv. more positive than the potential of the reversible hydrogen electrode under atmospheric pressure in the activating solution, this being achieved in accordance with the process for controlled activation by applying an anodic current.

The electrode was then provided with a current tap of a lye-resistant steel and immersed in a solution consisting of 360 ml. $H_2O$, 120 ml. $C_2H_5OH$ and 216 grams of KOH. At 66° C., a constant anodic current density up to 30 mamp./cm.$^2$ could be drawn. Its equilibrium rest potential was 1.14 volts with respect to the potential of a saturated calomel electrode. The effect of the inactive surface layer was observed to be particularly impressive at the border of the plate-shaped electrode where the working layer was not covered by the surface layer. This was the only area of the electrode where hydrogen bubbles were constantly evolved.

To prevent this detrimental marginal conversion, the electrode was clamped so as to seal the exposed marginal areas of the working layer and tested again in the same solution. Although hydrogen was no longer evolved, the current density which could be drawn from the electrode, based on the free surface area, was not decreased.

*Example 2*

The following mixtures of powders were uniformly introduced in succession into a die mold of 40 mm. plunger diameter:

(a) 1 gram of a mixture of 1.5 parts by weight of carbonyl nickel powder having a particle diameter of 1 to 5 microns and 1.0 part by weight of a pulverulent Raney nickel alloy having a particle diameter of 5 to 8 microns and consisting of Ni and Al in a ratio of 50:50 by weight.

(b) 10 grams of a mixture of 0.8 part by weight of carbonyl nickel powder having a particle size of 1 to 5 microns and 1.0 part by weight of a Raney silver alloy having particles in the range of 75 to 100 microns and an alloying ratio Ag:Al:Mn of 64.7:35.0:0.3% by weight.

(c) 1 gram of a mixture of powders as described under (a) above.

The electrode was compacted by pressing at a temperature of 450° C. and a pressure of 5000 kg./cm.$^2$. Following this, the aluminum was dissolved out of the electrode by means of 6-normal KOH in order to form the double-skeleton catalyst electrode structure. To promote the leaching process, an anodic current was applied to keep the potential of the electrode by 1000 mv. more positive than the potential of the reversible hydrogen electrode under atmospheric pressure. The electrode was then clamped in a holder of lye-resistant steel so as to seal the exposed marginal areas of the working layer. Then, a 15% alkaline $H_2O_2$ solution was passed into the holder and the assembly, i.e. the electrode and the holder, was combined with a hydrogen electrode in 6-normal KOH as the electrolyte to form a cell arrangement. In this arrangement, current densities up to 100 mamps./cm$^2$ could be drawn at room temperature from this electrode. The evolution of oxygen with the electrode out of circuit was practically zero.

*Example 3*

The following mixtures of powders were introduced in succession into a die mold having a plunger diameter of 40 mm.:

(a) 1 gram of a mixture of 1.2 parts by weight of copper powder having a particle diameter of 3 to 10 microns and 1.0 part by weight of a pulverulent Raney copper alloy having a particle size of 30 to 50 microns and a ratio of alloying constituents of Cu:Al=50:50 by weight.

(b) 10 grams of a mixture of 1.5 parts by weight of carbonyl nickel powder having a particle diameter of 1 to 5 microns and 1.0 part by weight of a pulverulent Raney nickel alloy having a particle diameter of 75 to 100 microns and a ratio of alloying constituents of Ni:Al=50:50 by weight.

The electrode was compacted by pressing at a temperature of 450° C. and a pressure of 5000 kg./cm.$^2$. It was then cemented into a holder of Plexiglas by means of an adhesive so as to seal the margins of the electrode. The working layer was situated facing the enclosed inner space of the holder. This space was connected by a tubing to a small gas reservoir provided with mercury as the sealing liquid. The aluminum was dissolved out of the electrode by means of 6-normal KOH in order to form the double-skeleton catalyst electrode structure. In doing so, the potential of the electrode, in accordance with the process for the controlled activation, was kept by 300 mv. more positive than the potential of the reversible hydrogen electrode under atmospheric pressure in the activating solution. This was achieved by applying an anodic current.

The electrode described above was combined as the cathode with a nickel double-skeleton catalyst electrode as the anode in an electrolytic cell arrangement. The electrolyte was 6-normal KOH and the electrolysis temperature was 40° C. With a current density of 50 mamps/cm.$^2$, electrolysis was effected against a gas reservoir pressure of 0.8 kg./cm.$^2$ gauge without a marked evolution of hydrogen occurring at the front copper layer.

Plastics materials to be used as surface layer should be indifferent or inert to the reaction liquids, the electrolyte, the reaction products and the gaseous components formed in the process. Suitable materials are for instance polyolefines like polyethylene and polypropylene, especially high molecular polyethylene.

The particle size of the Raney-alloy-powder may range between about 3 and 200/$\mu$, that of the pure metal powders for the supporting skeleton between about 1 and 50/$\mu$. The particle size of the material for the working layer hereby amounts to about 50 to 200/$\mu$, preferably 75 to 100/$\mu$, that of the material for the surface layer 3 to 50/$\mu$, preferably 5 to 50/$\mu$.

The moulding pressure amounts from about 2000 to 10,000 kg./cm.$^2$, preferably from 3000 to 5000 kg./cm.$^2$.

In the case that the pressing and sintering steps occur simultaneously, temperatures of 200 to 600° C., preferably 400 to 500° C. may be used, in the case, that sintering occurs after compacting of the electrode material by pressing, sintering temperatures of 400 to 900° C., preferably 600 to 700° C. are suited.

The pore size is dependent upon the moulding pressure, the sintering temperature, the particle size and the physical properties of the electrode materials. The pore radii of the catalytic working layer preferably range from 1 to 10/$\mu$, those of the catalytic surface layer from 0.2 to 1/$\mu$.

What is claimed is:

1. An electrode body, which comprises a catalytically active porous working layer and a catalytically inactive surface layer, a portion of said surface layer covering at least a portion of said working layer and being connected thereto, the portion of said surface layer covering said portion of said working layer being porous and having an average pore radius which is smaller than the average pore radius of said working layer.

2. An electrode body for the evolution of gases and for the electrochemical generation of energy from reducible and oxidizable reaction liquids, which are capable of reacting on catalytically active electrodes without current, to form at least one gaseous and electrochemically convertible component, which comprises a catalytically active porous working layer and a catalytically inactive surface layer, a portion of said surface layer covering at least a portion of said working layer and being in fixed abutment therewith, the portion of said surface layer covering said portion of said working layer being porous and having an average pore radious which is smaller than the average pore radius of said working layer at any point and greater than zero in at least a part of said surface layer portion, said catalytically inactive surface layer covering said working layer at least to an extent that ion communication with said working layer in an electrolyte is possible only through the pores of said inactive surface layer.

3. An electrode according to claim 1, wherein said catalytically inactive surface layer covers said working layer at least to an extent that ion communication with said working layer in an electrolyte is possible only through the pores of said inactive surface layer, said pores having an average pore radius within the range of from 0.1 to 100 microns.

4. An electrode according to claim 2 for the electrochemical generation of energy from materials reacting with evolution of hydrogen and for the evolution of hydrogen, wherein the working layer is formed of material capable of operating in an electrolyte in a fuel cell as a reversible hydrogen electrode, and the surface layer is formed of material such that upon so operating, the hydrogen minimum overvoltage of the surface layer with respect to the reversible hydrogen potential at the operating pressure in the electrolyte is higher than the reversible hydrogen potential at a hydrogen pressure which is equal to the capillary pressure of the electrolyte in the surface layer pores.

5. An electrode according to claim 2 for the electrochemical generation of energy from materials reacting with evolution of oxygen and for the evolution of oxygen, wherein the working layer is formed of material capable of operating in an electrolyte in a fuel cell as an oxygen electrode and the surface layer is formed of material such that upon so operating, the oxygen minimum overvoltage of said surface layer, with respect to the reversible oxygen potential at the operating pressure in the electrolyte is higher than the reversible oxygen potential at an oxygen pressure which is equal to the capillary pressure of the electrolyte in the surface layer pores.

6. An electrode according to claim 1, wherein said working layer contains a metal of the 8th sub-group of the periodic table of elements.

7. An electrode, according to claim 1, wherein said working layer contains nickel.

8. An electrode according to claim 1, wherein said working layer contains silver.

9. An electrode according to claim 1, wherein said working layer contains nickel and silver.

10. An electrode according to claim 1, wherein said catalytically active working layer has a double-skeleton catalyst electrode structure with from 20 to 80% by weight of Raney metal granules being embedded in from 80 to 20% by weight of electrically conductive supporting skeleton material.

11. An electrode according to claim 10, wherein the surface layer also has a double-skeleton catalyst electrode structure with from 20 to 80% by weight of Raney metal granules being embedded in from 80 to 20% by weight of electrically conductive supporting skeleton material, the Raney metal of said surface layer being catalytically inactive with respect to any reaction proceeding at the electrode.

12. In a fuel cell containing a solution including an electrolyte and a reaction substance capable of being converted electrochemically, the improvement which comprises an electrode body at least a portion of which is disposed in said solution having a catalytically active porous working layer and a catalytically inactive surface layer, said surface layer covering at least the portion of said working layer of the electrode disposed in said solution and being in fixed abutment therewith, the portion of said surface layer covering said portion of said working layer being porous and having an average pore radius which is smaller than the average pore radius of said working layer.

13. An improvement according to claim 12, wherein said electrode is arranged as a partition wall dividing said fuel cell into two compartments, one of which contains the electrolyte and a counter-electrode and the other of which contains the reaction substance capable of being converted electrochemically in liquid form, the surface layer portion covering the working layer portion facing the electrolyte having a smaller average pore radius than the surface layer portion facing the reaction substance.

14. An improvement according to claim 12, wherein said fuel cell is arranged as a decomposition cell for formation of gas from the reaction substance, said electrode being situated as a partition between two chambers, one of which contains the electrolyte and a counter-electrode and the other of which is capable of containing the gas evolved in the decomposition.

15. An improvement according to claim 14, wherein the surface of said working layer facing the chamber capable of containing the gas is free from said surface layer covering and is in direct communication with said gas-containing chamber.

16. An improvement according to claim 14, wherein two of said electrodes are provided, each in communication on one side with a gas-containing chamber, and each in partition contact on the other side with a common electrolyte therefor.

17. A process for operating a fuel cell for the electrochemical generation of energy from materials reacting with evolution of hydrogen by means of a gas electrode having a catalytically active porous working layer and a catalytically inactive porous surface layer covering the portion of said working layer in contact with the electrolyte of said cell and being in abutment with said working layer, which comprises operating the working layer as a reversible hydrogen electrode in said cell containing said electrolyte and a reaction solution capable of being converted electrochemically with evolution of hydrogen and maintaining the hydrogen minimum overvoltage of the surface layer with respect to the reversible hydrogen potential at the operating pressure in the electrolyte higher than the reversible hydrogen potential at a hydrogen pressure which is equal to the capillary pressure of the electrolyte in the pores of the surface layer of said electrode.

18. A process for operating a fuel cell for the electrochemical generation of energy from materials reacting with evolution of oxygen by means of a gas electrode having a catalytically active porous working layer and a catalytically inactive porous surface layer covering the portion of said working layer in contact with the electrolyte of said cell and being in abutment with said working layer, which comprises operating the working layer as an oxygen electrode and maintaining the oxygen minimum overvoltage of the surface layer with respect to the reversible oxygen potential at the operating pressure in the electrolyte higher than the reversible oxygen poential at an oxygen pressure which is equal to the capillary pressure of the electrolyte in the pores of the surface layer of the electrode.

References Cited by the Examiner

UNITED STATES PATENTS

| | | | |
|---|---|---|---|
| 1,182,759 | 5/16 | Emanuel | 136—86 |
| 2,384,463 | 9/45 | Gunn et al. | 136—86 |
| 2,716,670 | 8/55 | Bacon | 136—86 |
| 2,797,194 | 6/57 | Anderson et al. | 204—146 |
| 2,840,521 | 6/58 | Wasserman | 204—146 |
| 2,914,596 | 11/59 | Gorin et al. | 136—86 |
| 2,925,454 | 2/60 | Justi et al. | 136—154 |
| 2,947,797 | 8/60 | Justi et al. | 136—86 |
| 3,020,327 | 2/62 | Ruetsche | 136—86 |

JOHN H. MACK, *Primary Examiner.*

JOHN R. SPECK, *Examiner.*

UNITED STATES PATENT OFFICE
CERTIFICATE OF CORRECTION

Patent No. 3,201,282            August 17, 1965

Eduard Justi et al.

It is hereby certified that error appears in the above numbered patent requiring correction and that the said Letters Patent should read as corrected below.

Column 2, line 70, for "kg./cw.$^2$" read -- kg./cm.$^2$ --; column 3, line 68, for "layers" read -- layer --; column 4, line 55, for "groups" read -- group --; column 8, line 13, for mamp./cm.$^2$" read -- mAmp./cm.$^2$ --; same column 8, line 62, and column 9, lines 26 and 27, for "mamps./cm.$^2$", each occurrence, read -- mAmps./cm.$^2$ --; same column 9, line 30, for "Plastics" read -- Plastic --; column 10, line 1, for "radious" read -- radius --; column 12, line 20, for "poential" read -- potential --.

Signed and sealed this 15th day of March 1966.

(SEAL)
Attest:

NEST W. SWIDER            EDWARD J. BRENNER
Attesting Officer            Commissioner of Patents